Aug. 3, 1937.  E. J. PALO  2,088,807
TOOL JOINT
Filed Sept. 4, 1935
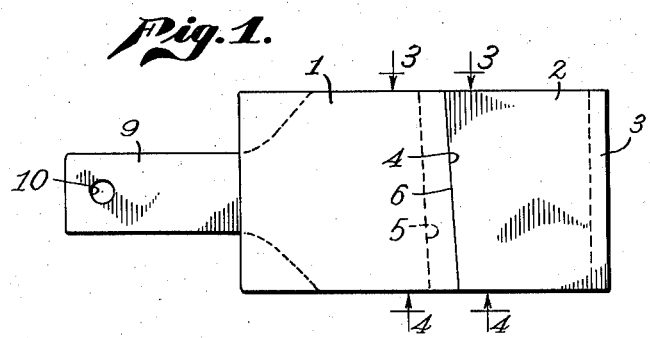
Fig. 1.
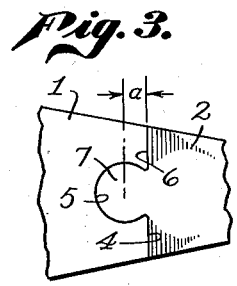
Fig. 3.
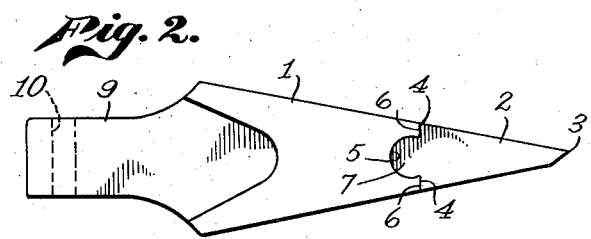
Fig. 2.
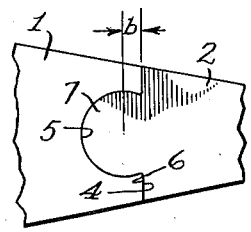
Fig. 4.
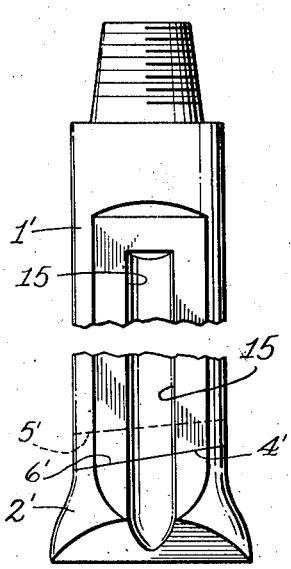
Fig. 6.
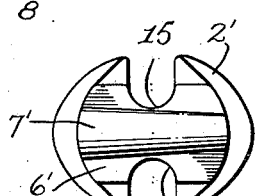
Fig. 7.
Fig. 8.
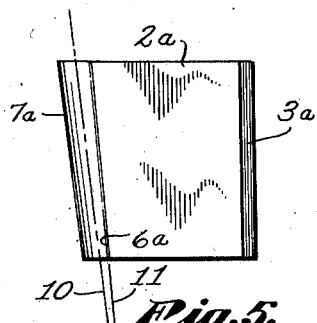
Fig. 5.
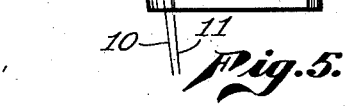
Inventor
Eero J. Palo
By Lyon & Lyon
Attorneys Patented Aug. 3, 1937

2,088,807

UNITED STATES PATENT OFFICE 2,088,807

TOOL JOINT

Ero J. Palo, Monrovia, Calif.

Application September 4, 1935, Serial No. 39,099

4 Claims. (Cl. 255—63)

This invention relates to a quick detachable joint construction for interconnecting two members and is particularly applicable to tools such as the digger teeth of power shovels and dredges, percussion drill bits and the like, in which the cutting or working ends of the tool are detachably mounted on supporting shanks to permit replacement of the cutting or working portion and also to permit making the tip or working portion of different material than the shank.

Another object of the invention is to provide a joint construction for tools that effects a rigid connection between the joined members and is capable of resisting longitudinal thrust forces, and also forces having a substantial lateral component in one direction in addition to a longitudinal thrust component.

Another object is to provide a joint construction that tends to lock itself in response to the forces applied on one direction thereto in use, but that may be quickly released by a blow from a hammer applied in a different direction.

Another object is to provide a joint construction having the foregoing advantages, in which one member is so shaped that it may be produced by a drop forging or casting operation with little or no subsequent machining, thereby substantially reducing the cost of manufacture.

The construction whereby the foregoing objects are attained will now be described in detail with reference to the drawing, in which Fig. 1 is a plan view of a digger tooth in accordance with the invention;

Fig. 2 is a side elevation view of the same tooth;

Fig. 3 is a detail side elevation taken in the position indicated by the arrows 3—3 in Fig. 1;

Fig. 4 is a detail side elevation taken in the position indicated by the arrows 4—4 in Fig. 1;

Fig. 5 is a plan view of the tip portion of the digger tooth in which the tongue and groove are cylindrical in shape instead of conical;

Fig. 6 is a side view of a cable tool incorporating the joint construction of the invention;

Fig. 7 is an end view of the tip portion of the cable tool shown in Fig. 6; and

Fig. 8 is a side view of the lower end of the cable tool shown in Fig. 6, the view being taken at right angles to the view of Fig. 6.

Referring to Figs. 1 and 2, the digger tooth therein depicted comprises a wedge-shaped base member 1 adapted to have secured thereto a wedge-shaped tip portion 2 having a cutting edge 3, the base and tip being joined together by a tapered tongue and groove connection.

Thus the base 1 is provided with a flat face 4 having a tapered conical groove 5 therein extending transversely thereacross substantially in the plane of the cutting edge 3. The tip 2 is provided with a face 6 adapted to abut against the face 4 of the base 1 and having a tapered conical tongue 7 projecting therefrom which, when the tool is assembled, fits snugly within the groove 5 in base 1. The two parts are joined by sliding the tip 2 transversely onto the base 1 until the tongue and groove engage and lock the base and tip tightly together.

The digger tooth described is adapted to be given a cutting movement in the general direction of the arrow 8 (Fig. 2) by any suitable mechanism, the base or shank 1 being attached to the mechanism in any convenient manner. Thus in the particular construction shown, the base 1 is provided with a rearward extension 9 having a hole 10 drilled therethrough to receive a pin or bolt for securing the extension 9 to a supporting member on a shovel or dredge.

To insure that the tip 2 will not become detached from the base 1 during digging movement in the general direction indicated by the arrow 8, the faces 4 and 6 on the base 1 and tip 2, respectively, are inclined at an oblique angle to the longitudinal axis of the tool. Furthermore, the large ends of the tongue 7 and the cooperating groove 5 are positioned adjacent that end of the inclined faces 4 and 6, respectively, which are closest to the cutting edge 3 of the tip 2. Therefore the longitudinal thrust between the tip 2 and the base 1, created in response to digging movement of the tool, produces a lateral force component parallel to the faces 4 and 6, tending to urge the tip 3 laterally with respect to the base 1 in such a direction as to tighten the tongue 7 in the groove 5. The taper of the groove 7 is clearly depicted in Figs. 3 and 4, in which the relative dimensions of the opposite ends of the tongue are shown.

I have also discovered that it is very important in a joint construction of the type described that the faces 4 and 6 on the base and tip, respectively, be engaged tightly against each other to produce a strong and solid connection. To this end, the axis of the conical tongue 7 is slightly inclined with respect to the plane of the face 6 so that movement of the tongue 7 into locking position with the groove 5 brings the face 6 snugly against the face 4 slightly before the tongue 7 completely fills the groove 5. This angularity between the axis of the tongue 7 and the face 6 is indicated in Figs. 3 and 4 in which "a" represents the distance between the axis of the tongue 7 and the face 6 at the small end of the tongue and "b" represents the distance between the axis of the tongue 7 and the face 6 at the large end of the tongue.

I have found that the construction described provides a very strong self-locking joint that will not become loosened in use. However, the tip 2 may be readily detached from the base 1 by tapping the side of the tip adjacent the small end of the tongue 7 with a hammer. It will be observed that there are three distinct tapers tending to hold the tip solidly on the base. Thus (1) the tongue 7 has its small end disposed rearwardly of its large end; (2) the faces 4 and 6 are inclined with respect to the plane of motion of the tool whereby the tip tends to slide into locking position with the base; and (3) the axis of the tongue 7 (and also of the cooperating groove 5) is so inclined to the plane of the faces 4 and 6 that movement of the tip into position locks the faces 4 and 6 tightly against each other. The latter taper between the axis of the tongue and the abutting faces is very important. In some instances, it, together with the inclination of the faces 4 and 6 with respect to the plane of motion of the tip may suffice to retain the tip in position, under which circumstances the tongue and groove may be of cylindrical (instead of conical) shape as shown in Fig. 5 wherein the axis of the tongue 7a is indicated at 10 and the extended plane of the face 6a is indicated by the line 11.

I am aware that it is old to employ inter-locking tongue and groove connections between two elements of the type to which this invention relates, but to the best of my knowledge it is new to employ a tongue and groove of rounded shape and to incline the tongue and groove with respect to the flat abutting faces of the elements. My construction has great advantage over those previously known to me, namely, that the tip portion 2, because of the rounded shape of the tongue 7, may be drop forged or cast in form to be used with little or no subsequent machining. This effects a great saving in cost since the tip must usually be made of extremely hard tough material that is very difficult to machine. In the prior constructions known to me, wedge-shaped tongues having sharp corners were employed which had to be shaped by cutting or grinding operations.

Furthermore, I find that inclining the axes of the tongue and groove with respect to the abutting faces, as shown in Figs. 3, 4 and 5, contributes greatly to the strength of the joint and reduces the possibility of the tip becoming loose in service.

Although the invention has been described in detail as applied to a digger tooth, it is applicable to other tools in which the tool is thrust against the material it is working on. Therefore an obvious application of the invention is to percussion drill bits, one type of which is illustrated in Fig. 6. This drill bit comprises a shank portion 1' and a tip portion 2' shown as having a single cutting edge and being of the type known as the "standard cable tool", which is continuously raised from and dropped against the material to be drilled, on a cable. Such a tool is usually provided with oppositely disposed, longitudinal channels 15 for the passage of water or mud as the tool is reciprocated, and these channels so change the cross section of the tool as to render impracticable the former methods known to me of anchoring a detachable tip. However, in accordance with my invention, the shank portion 1' and tip portion 2' are provided with flat faces 4' and 6', respectively, which abut against each other and are held in position by a tongue 7' which projects from the face 6' and engages in a groove 5' in the shank 1'. The faces 4' and 6' are inclined with respect to a plane normal to the axis of the tool exactly as in the digger tooth described in connection with Figs. 1 to 5, the only difference between the joint shown in Figs. 1 to 5 and that incorporated in the tool shown in Fig. 6 being in the cross sectional shape of the shank 1' and the tip portion 2' at the plane of intersection. It will be observed that the tongue 7' extends between the channels 15 and is not weakened by the channels.

The application of my joint construction to other tools than those specifically illustrated will be apparent to those skilled in the art and the invention is therefore to be limited only to the extent set forth in the appended claims.

I claim:

1. A tool comprising a supporting shank and a working tip detachably secured thereto in which said shank and tip are provided with abutting faces inclined at a slight angle to a plane normal to the axis of the tool, a tongue extending from the abutting face on said tip, said tongue having a continuously curved surface merging into said face of the tip, the axis of said curved surface lying outside the plane of said face but within a plane which is normal to said face and which passes through the axis of the tool, and a groove in the abutting face on said shank having a curved surface complementary to that of said tongue for engaging said tongue when said tip and shank are in abutting relation with each other, in which the axes of said curved surfaces of the tongue and groove, respectively, are slightly inclined with respect to said abutting faces in such direction as to lock said abutting faces together in response to transverse and rearward movement of said tip into seating position with said shank.

2. A cable tool of the type described comprising a shank and a cutting tip detachably secured thereto, said tool having longitudinal fluid channels extending on opposite sides thereof, in which said shank and tip are provided with abutting faces inclined at a slight angle to a plane normal to the axis of the tool, a tongue extending from the abutting face on said tip, said tongue having a continuously curved surface merging into said face of the tip and extending between said fluid channels, the axis of said curved surface lying outside the plane of the face but within a plane which is normal to said face and which passes through the axis of the tool, the abutting face on said shank being provided with a groove therein having a curved surface complementary to that of said tongue for engaging said tongue when said tip and shank are in abutting relation, the axes of the curved surfaces of said groove and tongue being inclined with respect to said faces in such direction as to lock said faces together in response to transverse movement of said tip into seating position on said shank.

3. A tool comprising a supporting shank and a working tip detachably secured thereto in which said shank and tip are provided with abutting faces inclined at a slight angle to a plane normal to the axis of the tool, a tongue extending from the abutting face on said tip, said tongue having a conical surface merging into said face of the tip, the axis of said conical surface lying without the plane of said face, the large end of said tongue being at the forward edge of said inclined face, and a groove in the abutting face on said shank having a conical surface complementary to that of said tongue for engaging said tongue when said tip and shank are in abutting relation with each other, in which the axes of said curved surfaces of the tongue and groove, respectively are slightly inclined with respect to said abutting faces in such direction as to lock said abutting faces together in response to transverse and rearward movement of said tip into seating position with said shank.

4. A digger tooth comprising a supporting shank with a cutting tip detachably secured thereto, said tooth being adapted for forward and lateral cutting movement within a given plane passing through the longitudinal axis of the tooth, in which said shank and tip are provided with flat abutting faces inclined at an angle to a plane normal to the longitudinal axis of the tooth, the plane of the abutting faces intersecting said given plane of digging movement at an oblique angle, a tongue extending from the abutting face of said tip, said tongue having a conical surface merging into said face of the tip, the axis of said conical surface lying outside the plane of the face and lying in an axial plane which is perpendicular to the given plane of said digging movement, the large end of said tongue being at the forward end of said inclined face, and a groove in the abutting face on said shank having a conical surface complementary to that of said tongue for engaging said tongue when said tip and shank are in abutting relation with each other, in which the axes of said conical surfaces of the tongue and groove, respectively, are slightly inclined with respect to said abutting faces in such direction as to lock said abutting faces together in response to transverse movement of said tip toward seating position of the said tongue with said groove.

ERO J. PALO.